United States Patent [19]

Michel

[11] Patent Number: 5,669,235

[45] Date of Patent: Sep. 23, 1997

[54] DEVICE TO GENERATE A FLOW OF COLD GAS

[75] Inventor: Friedel Michel, Erkath, Germany

[73] Assignee: Messer Griesheim GmbH, Germany

[21] Appl. No.: 603,656

[22] Filed: Feb. 20, 1996

[30] Foreign Application Priority Data

Feb. 24, 1995 [DE] Germany .................. 195 06 478.9

[51] Int. Cl.⁶ .................................................. F25B 1/00
[52] U.S. Cl. .................................. 62/614; 62/50.2; 62/616
[58] Field of Search .......................... 62/50.2, 614, 616

[56] References Cited

U.S. PATENT DOCUMENTS

| | | |
|---|---|---|
| 3,552,134 | 1/1971 | Arenson ........................ 62/50.2 |
| 4,170,115 | 10/1979 | Ooka et al. ..................... 62/50.2 |
| 4,464,904 | 8/1984 | Steigman ........................ 62/50.2 |

*Primary Examiner*—Ronald C. Capossela
*Attorney, Agent, or Firm*—Connolly & Hutz

[57] ABSTRACT

Two heat exchangers are hooked up together in order to generate a flow of cold gas. A deep-frozen liquefied medium is evaporated in the first heat exchanger (1) by means of heat exchange with a heat transfer medium. The evaporated medium is re-cooled in the second heat exchanger. The deep-frozen liquefied cryogenic medium used for this purpose is likewise evaporated in this process. The two flows of gas thus generated are conveyed to a mixing site and then combined to form a flow of cold gas.

10 Claims, 1 Drawing Sheet

DEVICE TO GENERATE A FLOW OF COLD GAS

BACKGROUND OF THE INVENTION

The need for flows of cold gas is becoming more and more widespread in various technical application areas. These are, in particular, application areas in which the low temperature of a liquefied, low-boiling gas such as, for example, liquid nitrogen, natural gas or hydrogen is not desired. The use of hydrogen or natural gas as a source of energy to power vehicles entails a major problem in terms of storage of sufficient quantities, since these gases have a low density. While the storage of compressed gas requires a tank with a large specific volume and consequently is only suitable for vehicles which have a large tank, hydride storage units have a high system weight. The resultant storage capacity limits the radius of action of the vehicles.

By far the highest storage densities can be achieved with the cryogenic storage of liquid hydrogen ($LH_2$) or liquid natural gas (LNG). This form of storage is the one that comes closest to the storage capacity of conventional fuel tanks.

The liquid cryogenic medium stored in the fuel tank has to be made available as cold gas to the motor or drive. Normally, the liquid cryogenic medium evaporates in a heat exchanger by means of heat absorption from a heat transfer medium (German Preliminary Published Application DE-05 43 02 556). Here, the cooling water available in a vehicle serves as the heat transfer medium. The cooling water has a temperature between 70° C. and 90° C.

A disadvantage of this simple method is that the evaporated cryogenic medium has to be greatly superheated, since the cooling water must not cool down too drastically prior to the heat exchange, in the case of full load, for example, it should not fall below approximately 60° C. in order to prevent freezing in the heat exchanger. The subsequent very high gas temperature of approximately 65° C. to 85° C., however, reduces the density of the mixture and thus the performance of the engine of a vehicle.

Such flows of cold gas are also employed, for instance, when rubber molded parts are de-burred by means of cryogenic gun blasting, when additional inner cooling is applied during the blow molding of plastics, and when highly elastic coatings undergo cold-gas polishing on the production line.

SUMMARY OF INVENTION

The invention is based on the objective of creating a device which uses a simple and reliable technique to generate a flow of cold gas by means of heat exchange and mixing of two evaporated cryogenic media, whereby this flow essentially has a constant temperature.

The invention is based on the idea of taking a cryogenic medium, such as deep-frozen liquefied hydrogen, nitrogen or natural gas which has been evaporated in a heat exchanger and conveying it as the heat transfer medium into a second heat exchanger and then to re-cool it by means of heat exchange with a partial flow of the same deep-frozen liquefied cryogenic medium which flows through the second heat exchanger. In this process, the deep-frozen cryogenic medium which flows through the second heat exchanger is likewise evaporated. Subsequently, both gas flows are mixed together. Due to the re-cooling principle, the two temperatures of the gas flows generated by evaporation are already fairly close to each other upstream from the mixing site. By employing two inexpensive heat exchangers which are available are mass-produced devices, it becomes possible to create a small and compact unit with a high performance level. When such a unit is used in a vehicle, the temperature of the cooling water that serves as the heat transfer medium need not be regulated down to a level where it would no longer be possible to reliably rule out freezing.

The use of temperature-controlled valves ensures good adjustability of the temperature since, due to the preceding heat exchange, two-phase flows are not present in the mixing site. The temperature regulator of the control valve—which operates and can be adjusted without auxiliary energy—is not subject to any special stress, since lower temperatures or temperature differences do not occur.

Experiments have shown that the mixing temperature remains quite constant, even in the case of appreciable and fast changes of the throughput rate such as those that take place, for example, when a vehicle is accelerated.

THE DRAWINGS

FIG. 1 is a front elevational view of a device for generating a flow of cold gas in accordance with this invention; and FIG. 2 is a side elevational view of the device of FIG. 1.

DETAILED DESCRIPTION

Figure 1:
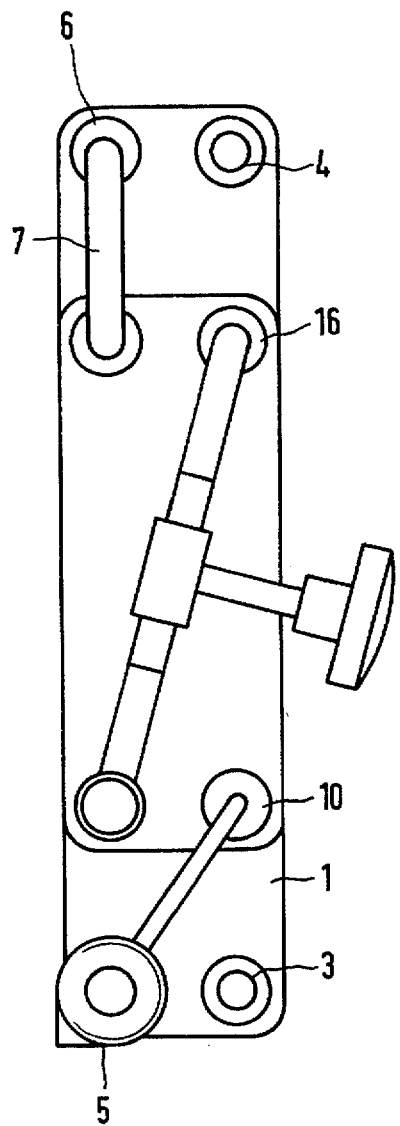
Figure 2:
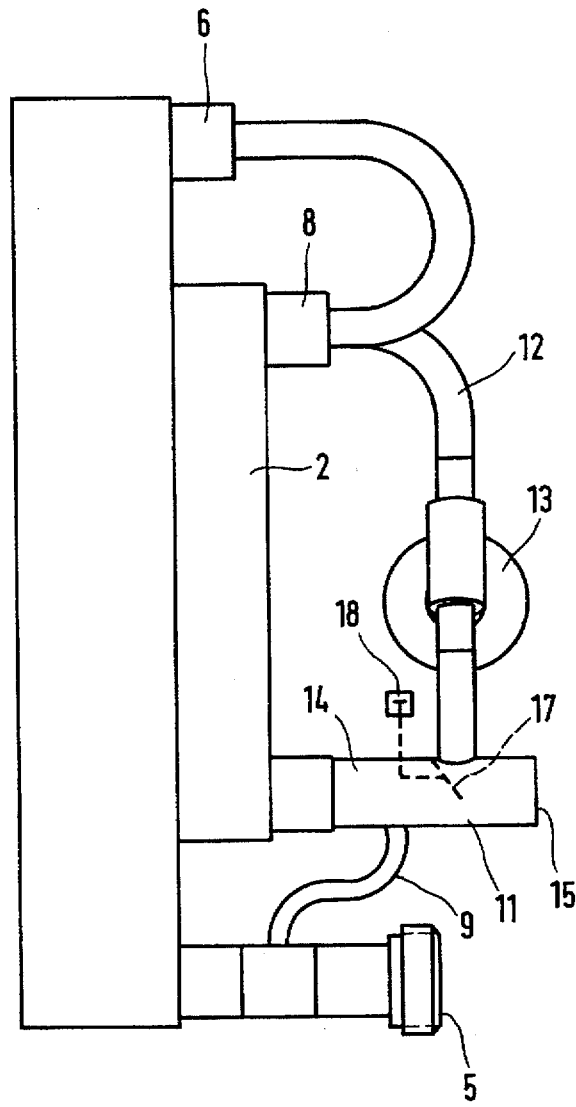

The drawing shows a first heat exchanger 1 connected to a second heat exchanger 2 and configured as a compact unit. Here, the heat exchanger 2, which is smaller than heat exchanger 1, is fastened onto heat exchanger 1. The first heat exchanger 1 has a connection 3 that serves as the inlet and a connection 4 as the outlet for a liquid heat transfer medium. Preferably, the connections 3 and 4 are linked to the cooling radiator of a vehicle whose cooling water, as the heat transfer medium, enters the heat exchanger 1 via connection 3 and exits via connection 4. A liquefied cryogenic medium, such as nitrogen, hydrogen or natural gas is fed through connection 5, preferably in a parallel flow, into the heat exchanger 1, which it then traverses and exits as gaseous cryogenic medium from connection 6. The medium evaporated in heat exchanger 1 is conveyed to heat exchanger 2 via the connection line 7. A connection 8 links the connection line 7 with the heat exchanger 2. Via line 9 and connection 10, the second heat exchanger 2 is fed with a partial flow of the liquid cryogenic medium which preferably moves in a parallel flow to the evaporated cryogenic medium of the heat exchanger 1 to the heat exchanger 2 while effectuating a heat exchange.

Since the partial flow of the liquefied cryogenic medium moves in a parallel flow to the evaporated cryogenic medium, a largely uniform temperature of the two gas flows is advantageously achieved at the mixing site 11. Naturally, the heat exchangers 1 and 2 can also be operated with flows moving in opposite or crosswise directions.

Then, the gaseous cryogenic medium is re-cooled as it releases heat and the liquid cryogenic medium is evaporated by releasing cold. The evaporated cryogenic medium exits from the heat exchanger 2 via the connection 16. Both gas flows converge at a mixing site 11 and then exit the device as a flow of cold gas. A valve 13 is installed in the line 12 which serves for the cold-releasing cryogenic medium of the heat exchanger 2 and which leads to the mixing site 11. The degree of opening of this valve 13 serves to regulate the temperature of the flow of cold gas. Naturally, instead of the manual valve shown in the drawing, it is also possible to install a temperature-controlled valve or a valve activated by an electric pulse or a fixed diaphragm control valve in line 12.

Preferably, the liquid cryogenic medium conveyed to the heat exchanger 2 is branched off from the heat exchanger 1 through the connection 5.

According to a second example of an embodiment, there is a temperature-controlled three-way valve 17 in the mixing site. This three-way valve 17 is only shown schematically in the drawing. It serves to open and close line 12 and line 14 of the two flows of cold gas as a function of the prescribed temperature values. A flow of cold gas having an essentially constant mixed temperature is available at the outlet 15 and it remains adequately constant even in the case of appreciable and fast changes of the throughput rate such as those that take place, for example, when a vehicle is accelerated.

What is claimed is:

1. In a device to generate a flow of cold gas by means of the heat exchange of a cryogenic medium with a heat transfer medium, the improvement being in a first heat exchanger having a heat transfer medium inlet and a heat transfer medium outlet, said first heat exchanger having a liquefied cryogenic medium inlet and an evaporated cryogenic medium outlet, a second heat exchanger having an evaporated gaseous cryogenic medium inlet, a connection line communicating with said evaporated gaseous cryogenic medium outlet of said first heat exchanger and said evaporated gaseous cryogenic medium inlet of said second heat exchanger for supplying the evaporated gaseous cryogenic medium from said first heat exchanger to said second heat exchanger, said second heat exchanger having a liquefied cryogenic medium inlet for flowing liquefied cryogenic medium through said second heat exchanger to re-cool the evaporated gaseous cryogenic medium and to evaporate the liquefied cryogenic medium, a mixing site, and connection lines communicating with said mixing site to supply the re-cooled cryogenic medium and the evaporated liquefied cryogenic medium from said second heat exchanger to said mixing site for mixing said mediums at said mixing site.

2. Device according to claim 1, characterized in that said first heat exchanger and said second heat exchanger are mounted against each other to form a compact unit.

3. Device according to said claim 2, characterized in that said inlet for the cryogenic medium from said second heat exchanger is linked to said inlet for the cryogenic medium from said first heat exchanger.

4. Device according to claim 3, characterized in that a valve is located in said line of said second heat exchanger.

5. Device according to claim 4, characterized in that said valve is a diaphragm control valve.

6. Device according to claim 4, characterized in that said valve is a metering valve.

7. Device according to claim 4, characterized in that said valve is a temperature-controlled three-way valve.

8. Device according to said claim 1, characterized in that said inlet for the cryogenic medium from said second heat exchanger is linked to said inlet for the cryogenic medium from said first heat exchanger.

9. Device according to claim 1, characterized in that a valve is located in said line of said second heat exchanger.

10. Device according to claim 1, characterized in that said valve is a temperature-controlled three-way valve.

* * * * *